HOSE COUPLING TOOL

Filed Oct. 13, 1967

INVENTOR.
WILFRED TUNSTALL
ALBERT WEGNER
BY
LIONEL V. TEFFT
Attorney

United States Patent Office 3,504,388

Patented Apr. 7, 1970

1

3,504,388

HOSE COUPLING TOOL

Wilfred Tunstall, 12874 2nd St., Yucaipa, Calif. 92399, and Albert Wegner, 223 Syllmer Court, Calimesa, Calif. 93453

Continuation-in-part of application Ser. No. 525,679, Feb. 7, 1966. This application Oct. 13, 1967, Ser. No. 675,115

Int. Cl. A47g *29/00;* B25f *1/00*

U.S. Cl. 7—1 1 Claim

ABSTRACT OF THE DISCLOSURE

An apparatus for attaching hose collars tightly to a faucet or nozzle and in addition provides a hose support for sprinkling. The device includes a clamp to be attached to a faucet or nozzle by a bolt passing through apertures formed in ears carried by the clamp. A combined bolt tightener and hose elevating member is carried by the threaded end of the bolt for selectively supporting a hose or tightening a bolt.

This application is a continuation-in-part of applicants pending case, Ser. No. 525,679, now Patent No. 3,422,469, filed Feb. 7, 1966.

This application for patent is directed to a household tool for quickly and easily accomplishing a hose coupling operation that has previously been done either manually or by using a pipe wrench or the like.

The device has a hose coupling clamp that is secured in a manner to be rotated by an attachable extended lever into non-leaking position on the faucet or nozzle. The extended lever also forms a sprinkling support for the nozzle and a washer removing element.

One of the main objects of the invention is to provide an easily applied tool for tightening hose couplings with out defacement or distortion.

Another object of the invention is in the provision of a household tool for specifically tightening hose couplings to prevent leakage and also providing a sprinkling support for the nozzle.

These and other objects and advantages of the present invention will become apparent to those skilled in the art upon consideration of the following detailed description of the preferred embodiment thereof, reference being made to the accompanying drawings, herewith, wherein:

FIGURE 1 is an elevation view showing the device attached to the faucet;

Figure 3:
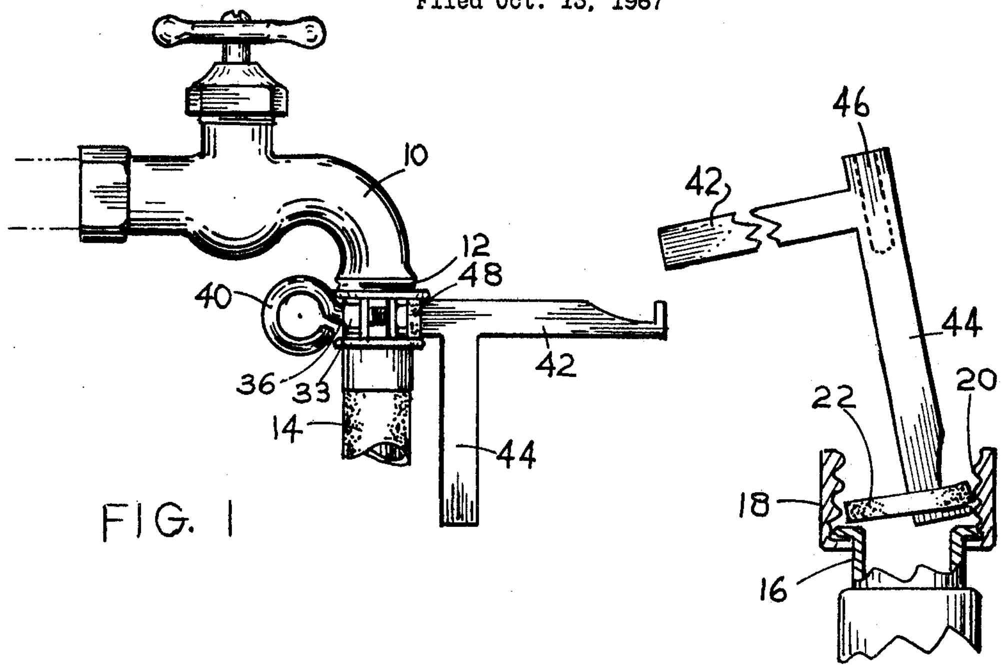
FIGURE 3 is a schematic view partially in section showing the device as a washer remover.
Figure 2:
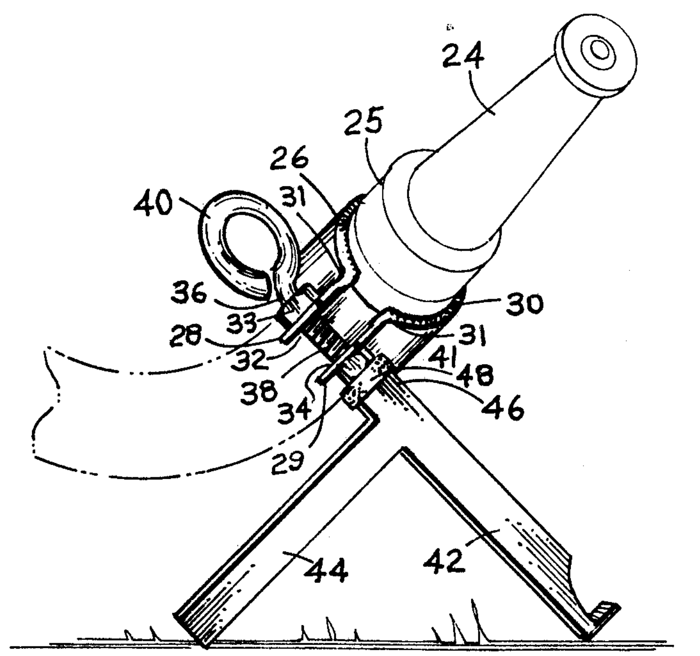
FIG. 2 is a perspective view showing the device in useful position on the nozzle.

Referring specifically to the drawings in which a preferred embodiment of the invention is shown a conventional faucet 10 of the bib type or otherwise has an exterior thread 12. A conventional flexible hose 14 has the standard circular flange 16 attachment to which is rotatably and loosely secured a collar 18 having an interior thread 20. A washer is shown at 22 resting on the upper edge of the flange which forms its seat. All of the parts above described are universally known and their attachment is not manually difficult except that it requires tremendous physical effort to make a connection that will not leak. A conventional nozzle 24 having the standard inwardly threaded connecting collar 25 is shown in FIGURE 3. The device is used in the same manner for hose tightening on faucet or nozzle.

2

Applicant provides an expansible ring clamp 26 having outwardly projecting ends 28 and 29. The ring clamp is serrated inwardly at 30 and the end 29 is bracketed at 31 on two sides. The ends 28 and 29 are apertured at 32 and 34, respectively, to receive a bolt 36 threaded extensively at 38 and having a large eye bolt end 40. The type of clamp connecting bolt is only important in that the large eye or ring end forms an easily available tightening means as well as an aid in releasing the clamp. A nut 41 on the threaded end 38 of the bolt 36 is held securely in the brackets 31. A nut 33 is secured on the eye bolt end.

The structure above described secures the clamp ring 26 to the collar 18 but does not provide a lever for tightening the coupling by rotative force.

A combined collar tightening lever and nozzle sprinkling support has right angularly disposed ends 42 and 44, the end 42 projecting slightly at 46 to permit usefull attachment to the threaded end 38 of eye bolt 36. The end 42 is interiorally threaded at 46 for connection to the eye bolt. A rubber washer 48 is of advantage in the attachment of the tightening lever. Either split end 42 or 44 may be fashioned to form a worn washer removing element as shown in FIGURE 3.

The operation of the device is relatively simple. The householder is now equipped with a specific device for tightening hose faucet and nozzle connections so that they will not leak. A sprinkling support and washer remover is also provided. It is easy to attach the collar clamp and then apply the lever so that little manual force is required to secure the coupling. When the device is used on the nozzle end, the lever forms a natural sprinkling support or bridge.

While we have described in considerable detail what we believe to be the preferred form of our invention, it will be understood by those skilled in the art that various changes may be made in the shape and arrangement of the several parts without departing from the broad scope of our invention as described in the following claims.

We claim:

1. A hose coupling tool for conventional faucet and nozzle connections, comprising:

- a clamping ring having projecting tightening ends;
- a threaded bolt and nut connection for the ends, the bolt end being extended to receive;
- a combined hose coupling tightening and releasing member and a nozzle support and elevating sprinkling device, including:
- ground engaging dual angularly disposed legs, one of said legs at its upper end being threadedly recessed for operative connection with the threaded bolt end.

References Cited

UNITED STATES PATENTS

| | | | |
|---|---|---|---|
| 532,557 | 1/1895 | Hoffman | 81—8.1 |
| 946,147 | 1/1910 | Mohrhoff | 248—85 |
| 1,373,673 | 4/1921 | Ritter | 24—279 |
| 2,283,179 | 5/1942 | Buckingham | 24—279 |

FOREIGN PATENTS

| | | |
|---|---|---|
| 37,839 | 9/1923 | Norway. |

ROBERT C. RIORDON, Primary Examiner

R. V. PARKER, Jr., Assistant Examiner

U.S. Cl. X.R.

248—83